Aug. 30, 1938.    O. C. SCHMIDT    2,128,734
RECEPTACLE FILLER
Filed April 25, 1936    2 Sheets-Sheet 2
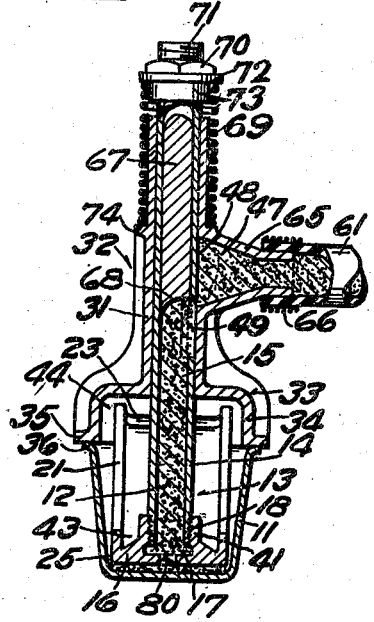
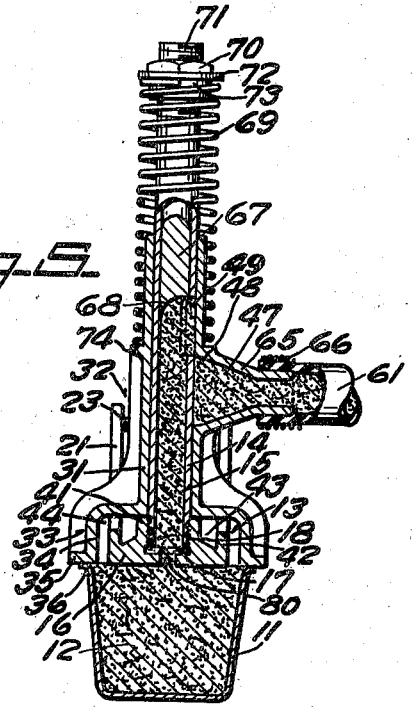
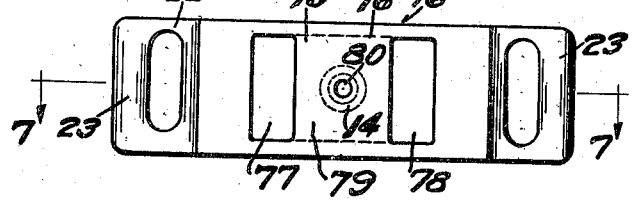
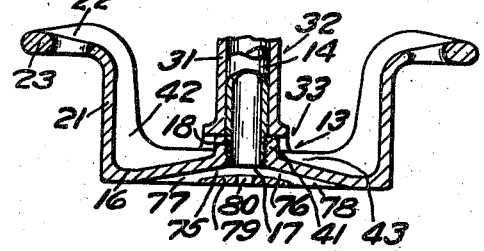
INVENTOR:
Oscar C. Schmidt,
by H. P. Hensleb
His Attorney.

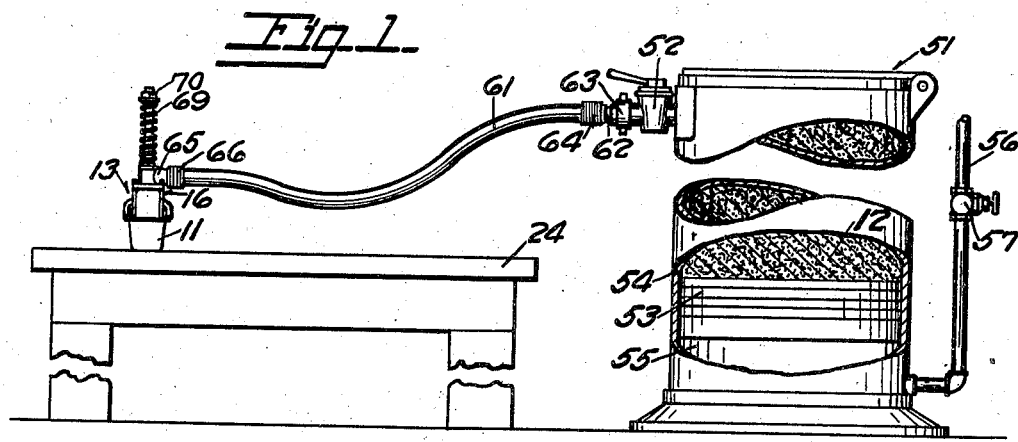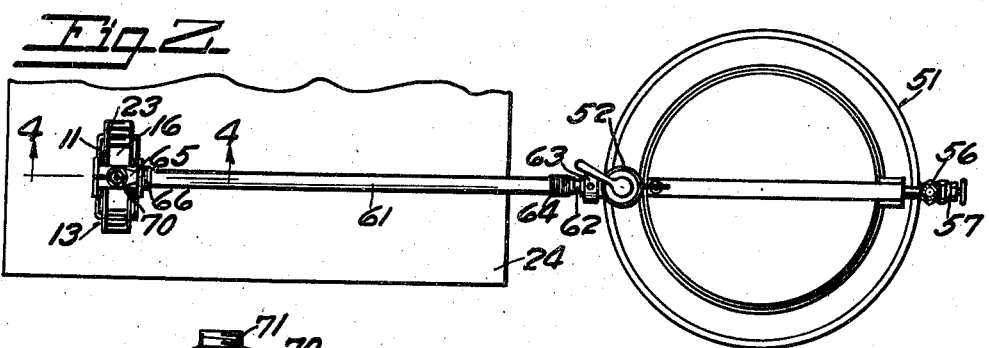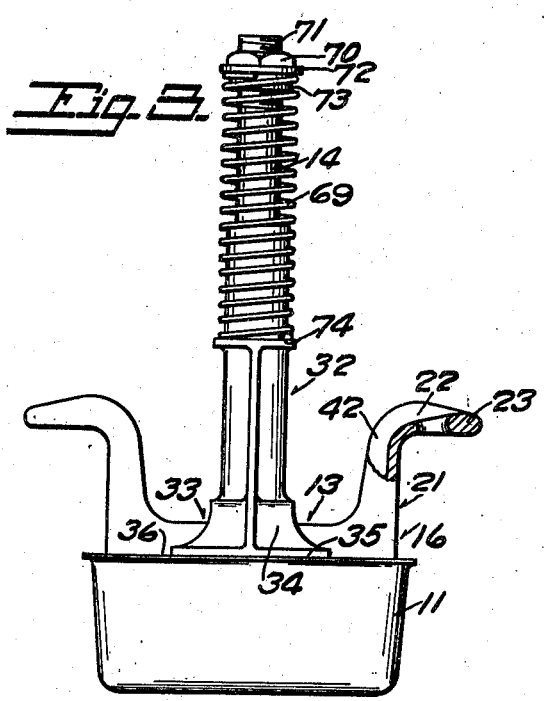

Patented Aug. 30, 1938

2,128,734

UNITED STATES PATENT OFFICE 2,128,734

RECEPTACLE FILLER

Oscar C. Schmidt, Cincinnati, Ohio, assignor to The Cincinnati Butchers' Supply Company, Cincinnati, Ohio, a corporation of Ohio Application April 25, 1936, Serial No. 76,440

11 Claims. (Cl. 226—93)

My invention relates to receptacle fillers for filling receptacles with plastic material, and is exemplified as employed in filling baking pans with meat dough, although it is obvious it may be employed in other relations.

Meat dough of this character is a plastic material containing finely ground or chopped meat and various ingredients, and is a thick flowable mass somewhat similar to sausage meat which is stuffed into sausage casings for making sausages. In the present instance the meat dough is fed into the pan for being baked to form a meat loaf.

Such meat dough has usually heretofore in the butchering art been placed in the pan by throwing a batch of the same forcefully into the pan in an attempt to simultaneously eject the air from the pan and from the mass of meat dough, it being found in such practice, however, that air pockets form between the meat dough and the pan and in the meat dough, and that portions of the meat dough fail to properly unite with each other and with the bulk of the dough, and that the resultant baked loaf contains pockets of air, seams and fissures, and readily separable lumps, making the loaf defective.

It is the object of my invention to avoid these objections and to provide novel means for filling the pan or receptacle in such manner that air is ejected from between the material and the wall of the receptacle and from the material, and for causing the material to flow into the receptacle while pressure is applied to the material in the receptacle in such manner as to exclude and prevent the formation of air pockets and bubbles between the material and the wall of the receptacle and in the material.

My invention consists in novel means whereby to feed the material into the receptacle and maintain pressure upon the mass of the material in the receptacle as it is being fed into and accumulates in the receptacle; further, in providing novel pressure means for the material; further, in providing novel supporting means for the same; further, in providing novel means for manipulating the pressure piece and for automatically controlling its position; further, in providing novel means for supporting and relating the parts of the device to the receptacle; and, further, in providing novel means for controlling the feeding of the material into the receptacle.

The invention will be further readily understood from the following description and claims, and from the drawings, in which latter:

Fig. 1 is a side elevation of my improved device, shown in a position of use and in connection with an exemplifying sausage stuffing machine instanced as employed in supplying the meat dough, partly broken away.

Fig. 2 is a plan view of the same, partly broken away.

Fig. 3 is an end view of my improved device, partly broken away.

Fig. 4 is a vertical section of the same, taken on the line 4—4 of Fig. 2, and partly broken away, and showing the relation of the parts in fully actuated positions at the beginning of a feeding movement.

Fig. 5 is a similar view, showing the relation of the parts in retracted positions.

Fig. 6 is a bottom view of the plunger; and,

Fig. 7 is an axial section of the same, taken on the line 7—7 of Fig. 6, and partly broken away.

My invention is an improvement on the invention shown, described and claimed in the application of George Schlereth, for patent on improvement in Receptacle fillers and method of filling receptacles, Serial No. 72,589, filed April 3, 1936, in the United States Patent Office.

The receptacle into which it is desired to place the material is represented at 11 as a baking pan in which to bake meat loaves. The plastic material which is to be placed in the receptacle is represented as meat dough, exemplified at 12. The material is arranged to be fed into the receptacle by means of a feeding part, shown as 30 a feeding plunger 13, which comprises a feeding channel 14, shown as a tube, provided with a feeding passage 15 and a pressure piece 16 having a feeding passage 17 which registers with the feeding passage in the tube. The pressure piece is arranged to be moved into the receptacle so as to initially discharge substantially at the bottom of the receptacle. The tube is shown connected with the pressure piece by a threaded connection 18.

The pressure piece has upward extensions 21 at each of its ends, the upper ends of which are projected laterally outwardly, as at 22, beyond the upper margins of the receptacle, forming pressure arms provided with handles 23, by means of which the plunger may be raised and lowered and the device may be moved into and out of the receptacles suitably placed at various points on a table 24.

The pressure piece is shown of rectangular form in cross section, corresponding to the rectangular form of the pan, and is arranged to be received in the pan so that the bottom of the pressure piece is substantially at the bottom of the pan. There is preferably a slight space 25 between the lateral margins of the pressure piece and the upright walls of the pan for permitting air to escape from between the pressure piece and the pan when the plunger is introduced into the receptacle and whilst the plastic material is being fed into the pan.

The tube forms a slide which extends upwardly from the pressure piece and is reciprocable in a bearing 31 of a standard 32, which has laterally extending brackets 33 at its lower end having downward extensions 34 at their outer ends provided with feet 35 at their lower portions arranged to be supported by the upper edges 36 of the side walls of the receptacle.

The pressure piece is provided with a central upwardly extending boss 41 with which the tube has the threaded connection 18, and with upwardly extending strengthening ribs 42 at its respective side margins, the middle portion 43 of the pressure piece being received in the downwardly presented cavity 44, formed in the standard by the lateral brackets 33, the downward extensions 34 and the feet 35, forming legs straddling the middle portion of the pressure piece when the pressure piece is in retracted position.

The standard has a feeding cavity 47 having an inner feed port 48. The tube has a feeding port 49. The feed port 48 is closed by the tube when the plunger is in up-position. When the operator has placed the feet 35 on the upper opposite edges of the receptacle and presses downwardly on the handles 23 to move the plunger to the bottom of the receptacle, the infeed port 49 comes into registry with the feed port 48, forming an automatic valve for permitting a flow of the plastic material from a suitable source into the pan.

This source is exemplified as a usual stuffing machine 51, in which the supply of meat dough is contained. The meat dough is arranged to be forced through a suitable valve 52, connecting with the interior of the stuffing machine. This forcing of the meat dough is obtained by means of a suitable piston 53 forced upwardly in the cylinder 54 by a suitable pressure fluid fed into the space 55 under the piston, and supplied to said space through a suitable pipe 56 having a suitable valve 57 therein. Such a stuffing machine is shown and described, for instance, in Letters Patent of the United States No. 2,004,618, granted on my application for improvement in Press head for stuffing machines, and dated June 11, 1935.

A flexible pipe 61 shown as a rubber hose has one end thereof secured to a usual nipple 62 connected with the feed valve 52 by a suitable coupling 63. This end of the hose is shown clamped to the nipple by a suitable wire binding 64. The other end of the hose is secured to an extension 65 of the wall of the cavity 47, as by being clamped thereto by a suitable wire binding 66.

The upper part of the tube 14 may be filled by a hard filling 67, the lower end of which slants downwardly opposite the port 49, as shown at 68, for directing the plastic material into the passage 15.

The meat dough is caused to exude through the valve 52 when the valves 52 and 57 are opened and upward pressure is being exerted by the piston 53, for causing the meat dough to pass through the nipple 62, the flexible hose 61, the cavity 47, the automatic valve ports 48, 49, the feed passage 15 in the tube 14 and the feeding openings in the pressure piece, when the plunger is lowered, thereby causing registry between the feed ports 49 and 48 and the cavity 47 for causing feeding movement of the meat dough and introduction thereof into the receptacle.

The plunger is normally in retracted position, with the upper end of the boss 41 bearing upon the lower end of the bearing 31 as a stop, being urged thereto by a helical spring 69 which normally moves the plunger upwardly. This spring surrounds an upper portion of the bearing 31 and the upper portion of the tube 14, which extends above the bearing 31. An adjusting nut 70 has threaded connection 71 with the upper end of the tube. It is provided with a shoulder 72 and a downwardly extending flange 73 about the tube. The standard is provided with an annular shoulder 74. The spring is located about the upper extension of the bearing, the upper portion of the tube and the flange 73 between the shoulders 72 and 74, for normally urging the plunger upwardly, the tension of the spring being adjustable by said nut.

The feeding passage 17 in the pressure piece has a number of feeding openings for discharging the plastic material at different points and in different directions at the bottom of the pressure piece. Thus the feeding passage 17 in the pressure piece has lengthwise extending branch passages 75, 76 projected in opposite directions therefrom, terminating in discharge openings 77, 78. A web 79 is thereby provided between the feeding passage in the tube and the bottom face of the pressure piece. Supplemental branching feeding passages for the plastic material are thus provided. This web may also be provided with a discharge opening 80 in line with the feeding passage in the tube. This latter discharge opening is of less area than the areas of the respective discharge openings 77, 78 to direct a large portion of the fed material through the discharge openings 77, 78. This construction spreads the delivery of the meat dough throughout a large portion of the area of the pan and provides for even distribution of the meat dough in the pan.

In operation, the operator grasps the device by the handles 23 and places the same upon a pan to be filled, resting the feet 35 on opposite upper edges of the pan. It will be assumed that pressure is being supplied upon the supply of meat dough in the stuffing machine by fluid pressure under the piston 53 for urging the piston upwardly in the cylinder. The valve 52 being opened, there is pressure of the plastic material against the tube, which in this relation obstructs the discharge port 48 of the cavity 47. The operator now presses downwardly on the handles 23 for quickly moving the plunger into the pan, so that the bottom of the plunger is adjacent to the bottom of the pan, thereby opening the feed port 48 for passage of the plastic material from the stuffing machine through the cavity 47, the ports 48, 49, the tube 14 and the various discharge passages and discharge openings or ports in the pressure piece, for discharging the plastic material into the bottom of the pan.

The operator maintains sufficient downward pressure upon the plunger by bearing manually upon the handles 23 so as to maintain pressure upon the plastic material between the plunger and the bottom of the pan and cause all surplus air in the plastic material to be discharged through the space 25 between the edge of the pressure piece and the wall of the pan and to prevent the formation of air pockets and bubbles, and further to solidify the plastic material and cause it to be formed as an integral body in the pan, the operator permitting the plunger to retreat out of the pan as the pan is being filled with the plastic material under such pressure, the operator continuing bearing pressure upon the handles 23 until the pan has been filled.

At the upper portion of rise of the plunger, the feed port 48 gradually closes, so that when the lower face of the pressure piece has arrived at the top of the pan, the feed port 48 will have closed, for stopping the feeding of the material.

The operator may then scrape the pressure piece by lateral movement between the pan and the plunger. Thus the operator may wipe the bottom of the plunger by scraping it upon the top edge of the pan.

The operator may immediately place the feet of the standard upon the opposite top edges of another pan and similarly fill the same, the filling of successive pans being accomplished very quickly and in convenient manner. The meat dough spreads readily throughout the cross-sectional area of the pan to form a solid mass free of air pockets and bubbles.

The flexible connection or rubber hose is of indefinite length so that the device may be readily placed selectively on pans in various locations on the table.

It will be understood that the flexible connection 61 and the tube 14 are continuously filled with the plastic material after the filling operation has begun, and continue to be so filled throughout the filling of the various receptacles. Continuous pressure is exerted by the piston 53 on the supply of material in the cylinder, and the valve 52 remains open throughout the operation of filling the pans desired.

The supply of material is flowed into the pans and the flow of material is caused to stop when the pans are filled by the operation of the automatic valve comprising the tube and its feeding port 49 in conjunction with the walls of the cavity 47, forming the port 48, it being understood that the tube and the discharge passages therefrom remain filled with the material to be fed, whether the automatic valve be opened or closed, exuding pressure being necessary to discharge the material through said passages.

My improved device is simple in construction, and is easily operated, and a great many receptacles may be evenly filled in rapid succession with little exertion and in such manner that air pockets and bubbles of air between the material and the wall of the receptacle and in the material are avoided, and the receptacles are solidly and evenly filled in an extremely sanitary manner.

I claim:

1. In receptacle filling means, the combination of a bearing, a feeding channel provided with a feeding mouth outside said bearing, a feeding valve between said bearing and said channel intermediate of the ends thereof and operated by movement between said channel and said bearing, a bearing-down part to bear upon the receptacle having connection with said bearing, resilient means between said bearing and said channel to relatively position said bearing and said feeding channel to normally close said valve, and presser means having attachment under said bearing with said feeding channel for movement between said channel and said bearing for positioning said feeding mouth adjacent to the bottom of the receptacle and for open relation of said valve and for resisting opposite movement between said feeding channel and said bearing to resist closing of said valve and to regulate pressure upon the material between said feeding mouth and said bottom of the receptacle.

2. In receptacle filling means, the combination of a bearing, a feeding channel provided with a feeding mouth outside said bearing, a feeding valve between said bearing and said channel intermediate of the ends thereof and operated by movement between said channel and said bearing, resilient means between said bearing and said channel to relatively position said bearing and said feeding channel to normally close said valve, said bearing having connection with a support on the receptacle, and pressure means having attachment under said bearing with said feeding channel for movement between said channel and said bearing for positioning said feeding mouth adjacent to the bottom of the receptacle and for open relation of said valve and resisting movement between said bearing and said feeding channel to maintain open relation of said valve and thereby regulating the pressure upon the material between said feeding mouth and said bottom of the receptacle.

3. In receptacle filling means for plastic material, the combination of a standard comprising an upright bearing and depending brackets at the lower end thereof, a plunger comprising a feeding channel reciprocable in said bearing and a pressure piece reciprocable between said brackets for coaction with the receptacle, a feed valve between said channel and said bearing, and means between said bearing and said channel to normally close said valve.

4. In receptacle filling means for plastic material, the combination of a standard comprising an upright bearing and depending brackets at the lower end thereof forming a space between said brackets, and a plunger comprising a feeding channel reciprocable in said bearing and a pressure piece provided with a feeding passage, the middle portion of said pressure piece movable into said space between said brackets and the end portions of said pressure piece having upwardly extending pressure arms having space therebetween in which said bearing is received.

5. In receptacle filling means for plastic material, the combination of means acting to force feed plastic material, a material resistant part substantially cross sectionally filling the receptacle being filled and arranged to act adjacent to the bottom of the receptacle at the beginning of the filling operation, means wherewith to exert pressure on said material resistant part toward the bottom of the receptacle, said material resistant part provided with a feeding mouth for the plastic material of substantially less cross-sectional area than the cross-sectional area of said material resistant part and discharging between said material resistant part and the bottom of the receptacle to cause separating movement between said part and the receptacle by such pressure during the filling of the receptacle, and a valve for the material whose operation is caused by such movement.

6. The combintion of a pressure piece for a receptacle filling device having a feeding passage for the plastic material and laterally extending branch passages extending from said feeding passage formed by a web of said pressure piece opposite the end of said feeding passage, said branch passages having discharge openings at the outer margins of said web, and said web provided with a discharge opening of smaller area than the areas of said respective first-named discharge openings.

7. In a receptacle filling means for plastic material, the combination of a bearing part provided with depending legs for coaction with the upper margin of a receptacle, a material resistant part having a lower pressure face for the material located on a level between said legs when in unfilling position and provided with a material passage having a discharge mouth adjacent the bottom of the receptacle when in filling position, and a valve for the material having operative connection with said material resistant part so as to be automatically closed and opened respectively in said unfilling position and said filling position.

8. In receptacle filling means for plastic material, the combination of a standard, a feeding part for plastic material under pressure therethrough, a feed valve between the respective ends of said standard and said feeding part, said feeding part comprising a presser part having a flat presser face to press upon the material and having a cross-sectional area and form of substantially the cross-sectional area and form of the receptacle being filled by said plastic material, said feeding part provided with a feeding mouth in said flat presser face of substantially less cross-sectional area than the cross-sectional area of said presser face, said feeding mouth located between said presser face and the bottom of the receptacle during feeding, manual means on the lower portion of said feeding part, and resilient means between said standard and said feeding part to normally place said feeding part in retracted position and to close said feed valve, said manual means by manual pressure thereon regulating said feed valve and the pressure of said presser face on the plastic material being fed substantially throughout the filling of said receptacle.

9. In receptacle filling means for plastic material, the combination of a standard, a feeding part, a feed valve between the respective ends of the same, said feeding part having a feeding mouth discharging material under pressure between said feeding part and the bottom of the receptacle being filled, said feeding part being of such cross-sectional form and size as to substantially cross-sectionally fill said receptacle whereby influx of material under pressure between said feeding part and said bottom causes separation between said feeding part and said bottom, resilient means positioned to normally close said feed valve by separation between said feeding part and said bottom, and manual means having attachment with said feeding part to cause approach between said feeding part and said bottom counter to the normal action of said resilient means for placing said feeding part in adjacency to said bottom and thereby to open said feed valve for such discharge of material under pressure between said feeding part and said bottom and whereby to resist said separation between said feeding part and said bottom to fill the receptacle with continuous pressure on the material substantially throughout said filling.

10. In receptacle filling means, the combination of a standard, an upright feeding part having sliding movement thereon, a feed valve between said standard and said feeding part controlled by said sliding movement, said feeding part having a lower projecting end with relation to said standard, a presser part for the material being fed into the receptacle located on said lower projecting end and provided with a feeding mouth for said material, and operating means for said feeding part having connection under said standard with said lower projecting end wherewith to impart sliding movement to said feeding part and thereby to exert pressure on said material by said presser part and to control said valve.

11. In receptacle filling means for plastic material, the combination of means acting to force feed plastic material into a cross-sectionally rectangular receptacle having upwardly extending walls and a bottom therebetween and an open upper end of substantially the cross-sectional shape and area of the cross-sectional space between said upwardly extending walls, a material resistant part substantially cross-sectionally filling the receptacle and arranged to act adjacent to the bottom of the receptacle at the beginning of the filling operation, means wherewith to press said material resistant part toward said bottom substantially throughout said filling, said material resistant part provided with a flat material pressing face of substantially equal cross-sectional shape and area with said cross-sectional space and with a feeding mouth for the plastic material of substantially less cross-sectional area than the cross-sectional area of said pressing face and discharging between said material resistant part and bottom of the receptacle to cause movement between said part and the receptacle by the pressure of said force-fed plastic material overbalancing said pressure of said material resistant part toward said bottom during the filling of the receptacle, and a valve for the material whose operation is caused by such movement.

OSCAR C. SCHMIDT.